(12) United States Patent
Zhao et al.

(10) Patent No.: US 6,407,737 B1
(45) Date of Patent: Jun. 18, 2002

(54) RENDERING A SHEAR-WARPED PARTITIONED VOLUME DATA SET

(75) Inventors: Tiecheng Zhao, Norwood; Vishal C. Bhatia, Arlington; Jan C. Hardenbergh, Sudbury; James M. Knittel, Groton; Hugh C. Lauer, Concord; Hanspeter Pfister, Somerville, all of MA (US)

(73) Assignee: Terarecon, Inc., San Mateo, CA (US)

( * ) Notice: Subject to any disclaimer, the term of this patent is extended or adjusted under 35 U.S.C. 154(b) by 0 days.

(21) Appl. No.: 09/315,400

(22) Filed: May 20, 1999

(51) Int. Cl.[7] .............................................. G06T 17/00
(52) U.S. Cl. ..................................................... 345/424
(58) Field of Search ................................ 345/418, 419, 345/420, 423, 424, 425

(56) References Cited

U.S. PATENT DOCUMENTS 6,243,098 B1 * 6/2001 Lauer et al. ................. 345/424
6,262,740 B1 * 7/2001 Lauer et al. ................. 345/424
6,310,620 B1 * 10/2001 Lauer et al. ................. 345/424
6,313,841 B1 * 11/2001 Ogata et al. ................. 345/424

OTHER PUBLICATIONS

Amin et al.; "Fast Volume Rendering Using an Efficient, Scalable Parallel Formulation of the Shear–Warp Algorithm"; 1995 Parallel Rendering Symposium; Oct. 30–31, 1995; pp. 7–14.

Philippe Lacroute; "Real–Time Volume Rendering on Shared Memory Multiprocessors Using the Shear–Warp Factorization"; 1995 Parallel Rendering Symposium; Oct. 30–31, 1995; pp. 15–22.

* cited by examiner

*Primary Examiner*—Cliff N. Vo
(74) *Attorney, Agent, or Firm*—Dirk Brinkman

(57) ABSTRACT

A volume data set having voxels arranged according to an object coordinate system is shear-warp rendered by partitioning, relative to the object coordinate system, the volume data set into a plurality of axis aligned sets of voxels. The selected axis aligned sets of voxels are rendered as pixels in intermediate baseplanes. There is one intermediate baseplane for each selected set of axis aligned voxels. The intermediate baseplanes are combined and warped to an image.

26 Claims, 8 Drawing Sheets

600

RENDERING A SHEAR-WARPED PARTITIONED VOLUME DATA SET

FIELD OF INVENTION

The present invention is related to the field of volume graphics, and in particularly to rendering an image of a shear-warped volume data set.

BACKGROUND OF THE INVENTION

A volume data set is defined as an array of voxels. The voxels have values representative of some real or imaginary object. Therefore, the voxels are typically arranged in a memory according to object coordinates. Rendering of the volume produces pixels arranged according to image coordinates.

Sometimes, the size of the volume data set is either too large or too complex to be processed in a single rendering pass by a single rendering engine. In other words, the numbers of voxels to be processed exceed memory or processing limitations. In this case, it become necessary to partition the volume into sets of voxels. These sets can then be rendered independently, either sequentially or in parallel. Finally, the results of the independent renderings can be combined into a final image that is the same as the image that would have been generated in a single pass rendering.

There are many methods in the prior art that use partitioning of volume data in conjunction with direct volume rendering. They can be roughly divided into image partitioning and object partitioning methods. In image partitioning, each rendering task computes a specific portion of the image. Sets of pixels are computed by moving the volume data to one or more rendering engines as the viewing transformation changes. In object partitioning, each rendering engine is assigned a specific subset of the volume data to render. The partial results from each rendering must then be combined together to form the image.

In "Real-Time Volume Rendering on Shared Memory Multiprocessors Using the Shear Warp Factorization," Parallel Rendering Symposium, pp. 15–22, 1995, Lacroute presents a parallel shear-warp rendering method that requires a shared-memory architecture for efficient operation. There, an image partitioning of the base-plane is used in conjunction with an object partitioning of the volume. The volume is partitioned into sets of voxels that are on slices aligned perpendicular to viewing rays. The alignment of the partitioned sets of voxels is performed by shearing the slices according to viewing parameters, and subsequently warped the intermediate results to a final image.

As a disadvantage, Lacroute's method requires that each rendering engine have access to the entire volume data set because many of the rays pass through all of the slices. This either increases the amount of storage required, or else, requires specialized hardware, such as a shared-memory computer. In addition, the partitioning and shearing need to be done for every different viewing angle.

Amim et al., in "Fast Volume Rendering Using an Efficient, Scalable Parallel Formulation of the Shear Warp Algorithm, Parallel Rendering Symposium, pp. 7–14, 1995, describes an extension of Lacroute's shear-warp method. Here, the volume is object partitioned according to slices that are parallel to the viewing rays. This view point dependency leads to a need to communicate voxels among rendering engines, which is more inefficient than Lacroute's image partitioning method. Although Amim's method allows a partitioning of the volume according to the number of rendering engines, it still suffers, like Lacroute, in being view point dependent.

Therefore, it is desired to render a volume by distributing volume partitions over multiple rendering engines and their associated memories in such a way that any viewing angle can be handled without a repartitioning of the data. In addition, the rendering must meet the following requirements.

The quality of the final image must be comparable to that which would have been generated in a single-pass rendering of the volume. There should be no visually disturbing artifacts due to the combining of partial results from multiple rendering passes. The rendering engine should transparently handle the rendering of partitioned volumes, including special effect rendering requirements such as cropping, cut-planes, and cursors that may extend or operate across partition boundaries. It should also be possible to obtain the intermediate results of the independent renderings.

SUMMARY OF THE INVENTION

The invention provides a method and apparatus for shear-warp rendering a volume data set that is partitioned into smaller parts. The smaller parts can then be processed independently, either in parallel or serially, to overcome spatial or temporal constraints.

The volume data set is stored in a memory as an arrangement of voxels using object coordinate system. The voxels of the volume data set are object partitioned, relative to the object coordinate system, into a plurality of axis aligned sets of voxels. The axis aligned sets of voxels can have arbitrary dimensions.

Selected ones of the axis aligned sets of voxels are independently rendered as pixels in intermediate baseplanes. There is one intermediate baseplane for each selected set of axis aligned voxels. The intermediate baseplanes are then combined and warped to an image.

As an advantage of the invention, an arbitrary viewing direction can be selected without repartitioning the image or object. In another aspect, the combining and warping is performed either after all of the intermediate baseplanes have been rendered, or incrementally after each individual intermediate baseplane has been rendered.

To support view independence, duplication of rendering samples is avoided at the edge of volume partitions.

DETAILED DESCRIPTION OF THE PREFERRED EMBODIMENTS

Introduction

Figure 1A:
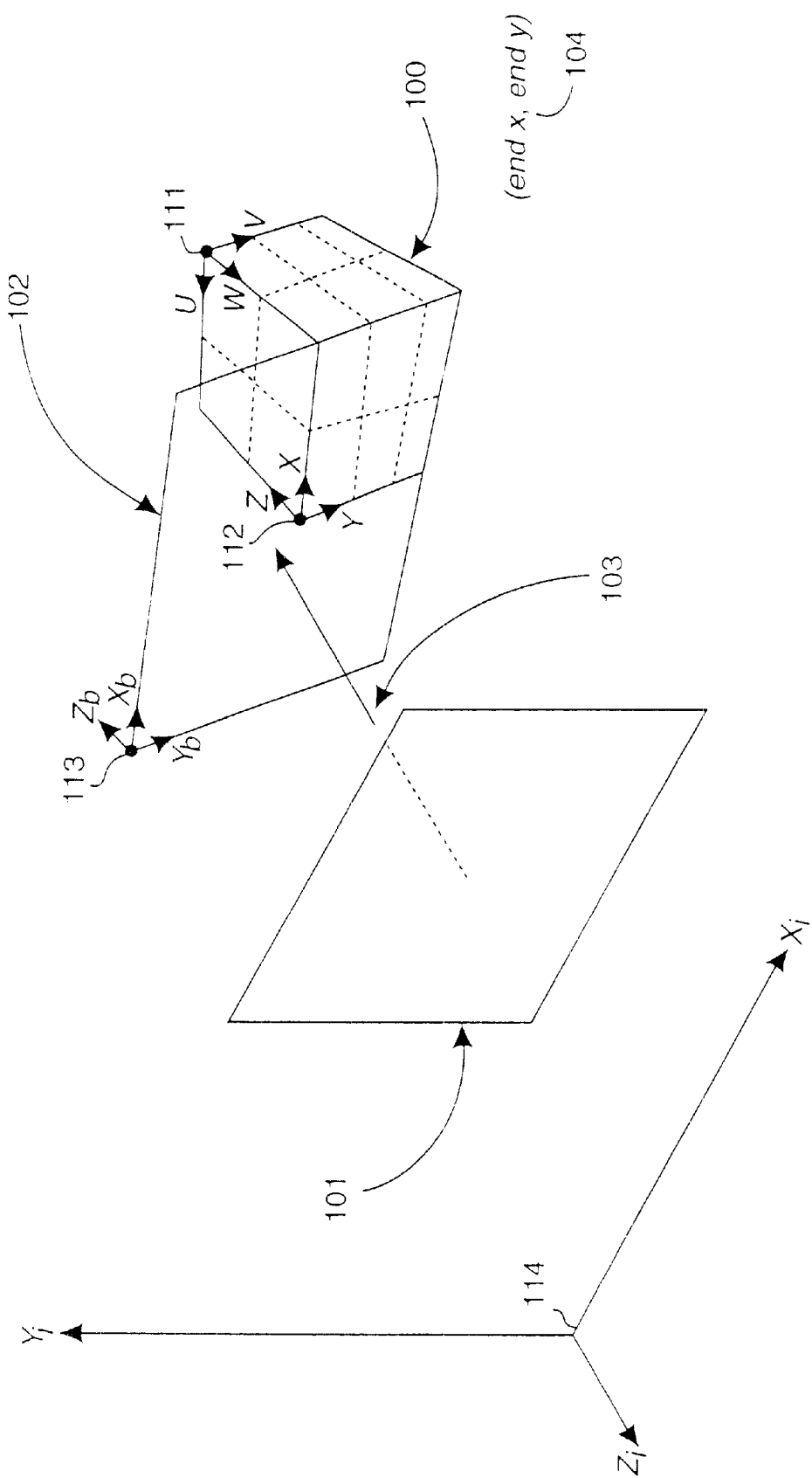
FIG. 1a is a block diagram of coordinate systems used by the invention.
Figure 1B:
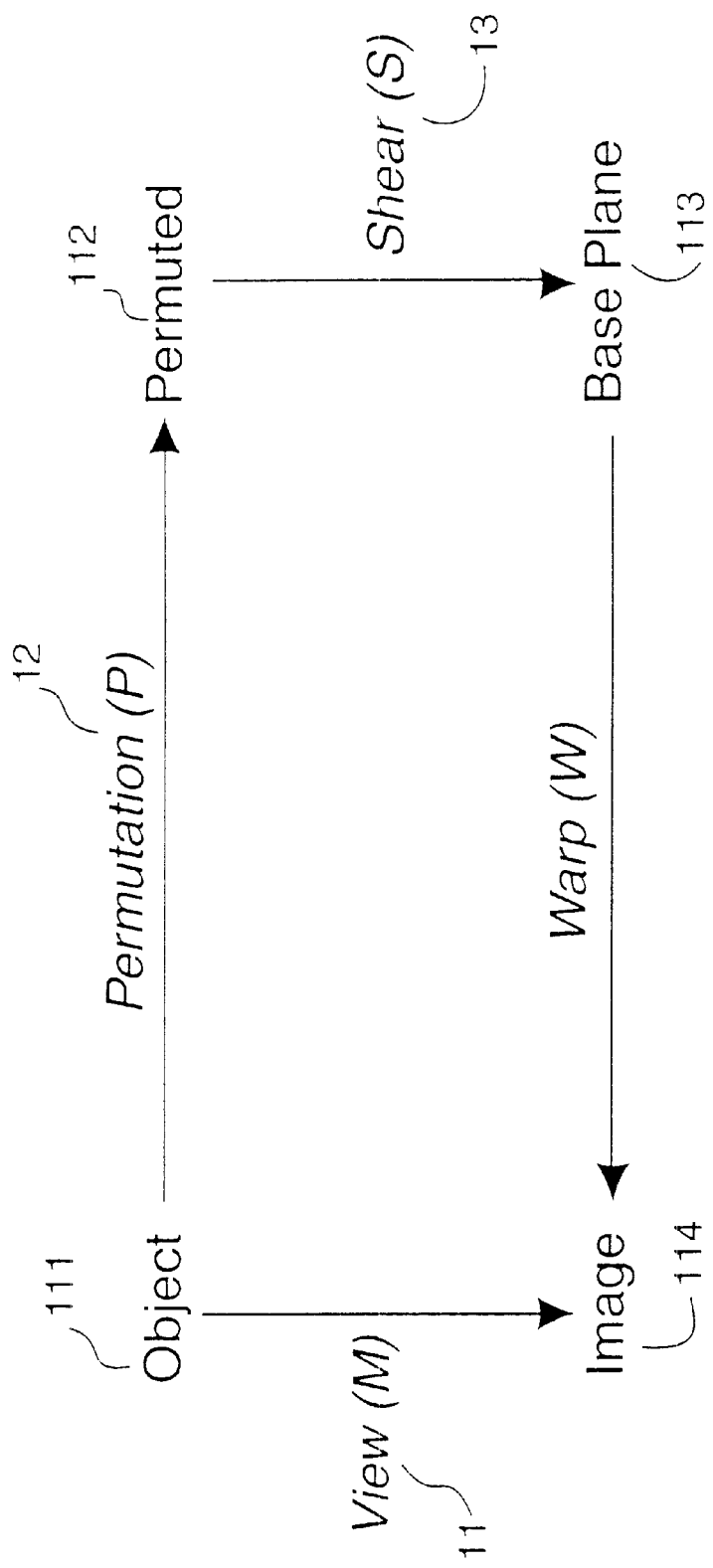
FIG. 1b is a block diagram of coordinate transformations used by the invention.

By way of introduction, FIG. 1a shows various coordinate systems that are used during the rendering of partitioned volumes according to the invention, and FIG. 1b shows transformations between the various coordinate systems of FIG. 1a.

Coordinate Systems

As shown in FIG. 1a, the rendering of a partitioned volume 100 onto an image plane 101 via a baseplane 102s, according to the invention, uses four coordinate systems, object coordinates (u, v, w) 111, permuted coordinates (x, y, z) 112, baseplane coordinates ($x_b$, $y_b$, $z_b$) 113, and image coordinates ($x_i$, $y_i$, $z_i$) 114. The object and image coordinates are typically expressed as right-handed coordinate systems. The permuted coordinate system may be either right-handed or left-handed, depending upon the viewing direction. The baseplane coordinate system has the same handedness as the permuted coordinates.

The volume is defined using object coordinates with axes u, v, and w. The origin is located at one corner of the volume, typically a corner representing a significant starting point from the volume's own point of view. Any access to a voxel in the volume is expressed in terms of u, v, and w. These object coordinates are used to obtain offsets. The unit distance along each axis is equal to the spacing between adjacent voxels along that axis.

In FIG. 1a, the volume, represented by the cube 100, happens to be oriented so that its origin is in the upper, right, rear corner. That is, the object represented by the volume data set 100 is being viewed from the back, at an angle. With the permuted coordinate (x, y, z), the origin is repositioned to be the vertex of the volume nearest to the image plane 101, and the z-axis is the edge of the volume most nearly parallel to a view direction. The x- and y-axes are selected so that traversal of the voxels always occurs in the positive direction.

In FIG. 1a, the origin of the permuted coordinate system is the opposite corner from the object's origin. The baseplane coordinates (x, y, z) is a system in which the $z_b=0$ plane is co-planar with the xy-face of the volume expressed in permuted object coordinates. The baseplane itself is a finite plane that extends from a baseplane origin to a maximum point 104 that depends both upon the size of the volume and upon the view direction.

From this maximum point, values endX and endY are derived. These values map the baseplane onto a pixel memory for the image output. As can be seen in FIG. 1a, the baseplane is positioned so that the maximum values of x and y in permuted coordinates are aligned with endX and endY, respectively, in baseplane coordinates. The origin of the baseplane coordinate system is the pixel resulting from a ray that passes through, or very near to, the upper, left, rear corner of the volume data set in permuted coordinates. In particular, this is the upper leftmost ray that strikes the volume.

The size of the baseplane is a function of both the size of the volume data set and the view angle. The maximum size baseplane occurs when the viewing direction is 45° to all faces. The minimum size is the size of the face of the volume, that is, objectSizeX* objectSizeY, when the view direction is perpendicular to the baseplane.

The image coordinates (x, y, z) are the coordinates of the final image resulting from rendering the volume. Its $z_i=0$ plane is the plane of the computer screen, printed page, or other medium on which the volume is to be displayed. It consists of the axes $x_i$ and $y_i$ in the plane of the image to be generated, also called the image plane, and the axis $z_i$ which is normal to the image plane. The $x_i$-axis increases from left to right, the $y_i$-axis increases from bottom to top, and the $z_i$-axis increases in the direction toward the viewer. Measurements along $z_i$-axis indicate the distance from the image plane to the object. Typically, pixels in the image plane are located at integer coordinates in the $x_i y_i$-plane.

A viewing vector 103, sometimes called the eye vector, is parallel to the $z_i$-axis but points in the negative direction, that is, away from the viewer.

Note, FIG. 1 is somewhat deceptive in its simplicity. Depending upon the view direction, any one of the eight vertices of the volume data set may become the origin in permuted coordinates. Moreover, for any origin, there are three possible right-handed and left-handed permutations of the axes. Therefore, there are twenty-four useful orientations of the volume data set with respect to the baseplane.

Transformation Matrices

Just as there are four important coordinate systems 111–114, there are also four important transformations 11–14 as shown in FIG. 1b. Each transformation is expressed as a matrix. M 11 is the view matrix, P 12 is the permutation matrix, S 13 is the shear matrix, and W 14 is the warp matrix. FIG. 1b shows the relationships of the transformations.

The view matrix M is provided by the application. This matrix specifies how the object denoted by the volume data set is positioned in image space, i.e., with respect to an image on a screen or some other output device. Typically, the view matrix is a concatenation of transformations that translate, rotate, scale, and clip the object, thereby converting its representation in object coordinates to a corresponding representation in image coordinates.

The permutation matrix P denotes a transformation of the axes and origin of the volume data set within itself. It "moves" the origin from its natural position to a position nearest the image plane, as described above.

The shear matrix S is the mathematical representation of the rendering operation itself. Strictly speaking, the rendering operation is a projection of points in the volume data set onto points on the baseplane. In order to use the matrix S to derive the warp matrix W, it is necessary to first obtain the inverse $S^{-1}$. Unfortunately, a projection transformation has no inverse. Therefore, S is defined to be a three dimensional shear transformation that maps each point (x, y, z) to a corresponding point ($x_b$, $y_b$, z), thus preserving its z-coordinate.

Finally, the warp matrix W is a mathematical representation of the post-rendering step needed to remove the distortions inherent in the baseplane image. It is the only unknown in FIG. 1b, and is related to the other three matrices as follows:

$$M = W \times S \times P$$

That is, projecting the volume into image space (using M) produces the same result as first permuting the object to permuted coordinates, using P, and then projecting it to the baseplane, using S, and finally warping that result to the image plane, using W.

Because M is provided by the application and P and S are easily derived, W can be obtained by solving:

$$M \times P^{-1} \times S^{-1} = W.$$

The resulting matrix W embodies the stretching, shrinking, flipping, rotation, and/or translation needed to convert the baseplane image into a viewable image in the image plane.

Note, matrices M, S, and P are all 4×4 invertible matrices, therefore, so is W. But in practice, W is used to map the two dimensional baseplane into the two dimensional image plane.

System Description

Partitioning Volumes into Axis Aligned Voxel Sets

Figure 2:
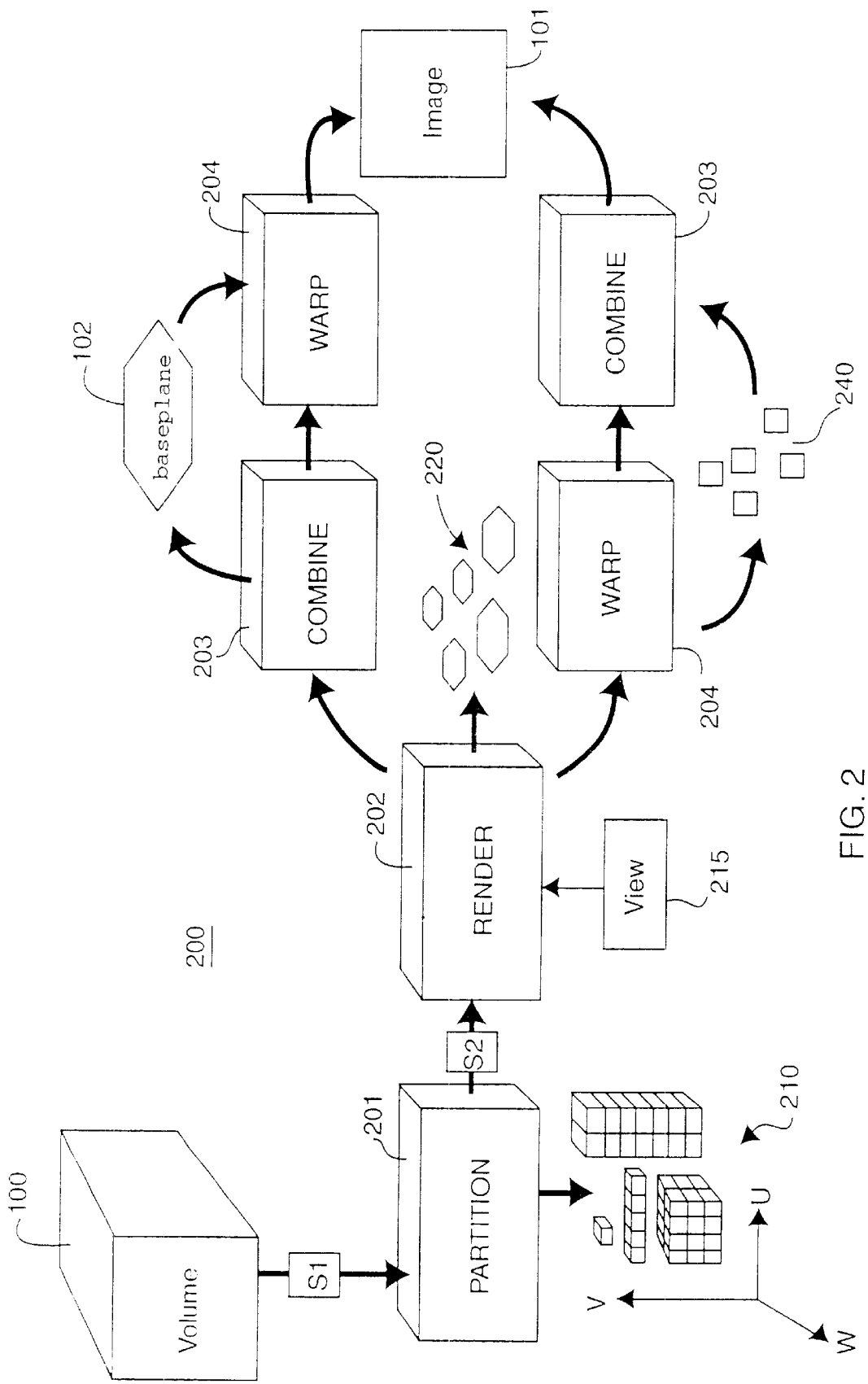
FIG. 2 is a block diagram of partitioned volume rendering according to the invention.

FIG. 2 shows a flow diagram of a rendering system 200 according to the invention. First, a region of interest in the volume 100 is selected (S1) for rendering. The region can include the entire volume, or some part of it. The voxels in the selected region are partitioned 201 into axis aligned sets of voxels 210. With the present invention, the partitioning is relative to the object coordinates 111 of FIG. 1b. As shown, the partitioning can produce single voxels (a zero-dimensional set), a row of voxels (a one-dimensional set), a slice of voxels (a two-dimensional set, and parallelipeds (three-dimensional sets) 210.

Partitioned sets of voxels can be selected (S2) for rendering 202. Normally, all sets are selected, but this is not necessary to work the invention. The rendering projects the voxel values of each set onto pixels of corresponding intermediate baseplanes 220, according to a view 215. Significantly, and in contrast with the prior art, the view 215 can be selected after the partitioning 201. This has the advantage that different viewing orientations can be rendered without having to repartition the volume.

Rendering

In the preferred embodiment, the rendering is done by a rendering engine including a plurality of rendering pipelines fabricated on a single semiconductor chip as described in U.S. patent application Ser. No. 09/191,865 "Two-Level Mini-Block Storage System for Volume Data Sets" incorporated herein by reference. The selected sets of voxels can be rendered in parallel by multiple rendering engines, or serially by a single rendering engine.

Combining and Warping

At this point, the next two steps combining and warping can be done in either of two orders. The combining and warping can be done by software of hardware. In the first order, the intermediate baseplanes 220 are combined 203 into the baseplane 102, and the baseplane then is warped 204 to produce the image 101 representative of the volume 100. In the second order, the intermediate baseplanes are warped to produce intermediate images 240, and the intermediate images can then be combined to produce the entire final image 101.

Each axis aligned set of voxels can be rendered in a front-to-back or back-to-front order. In combining either intermediate baseplanes or images, both compositing orders are valid as well.

There are two ways to perform the combining and warping. One way stores all intermediate results until all the sets are rendered. Then, generate the image 102 and 101 in the back-to-front or front-to-back order from the intermediate results. Another way builds up the image 102 or 101 as one renders. The advantage of the first approach is that the sets can be rendered in any order that is convenient, or advantageous. The advantage of the second approach is that there is always a valid image, even if the image is only a partial image.

Overlap

Figure 3:
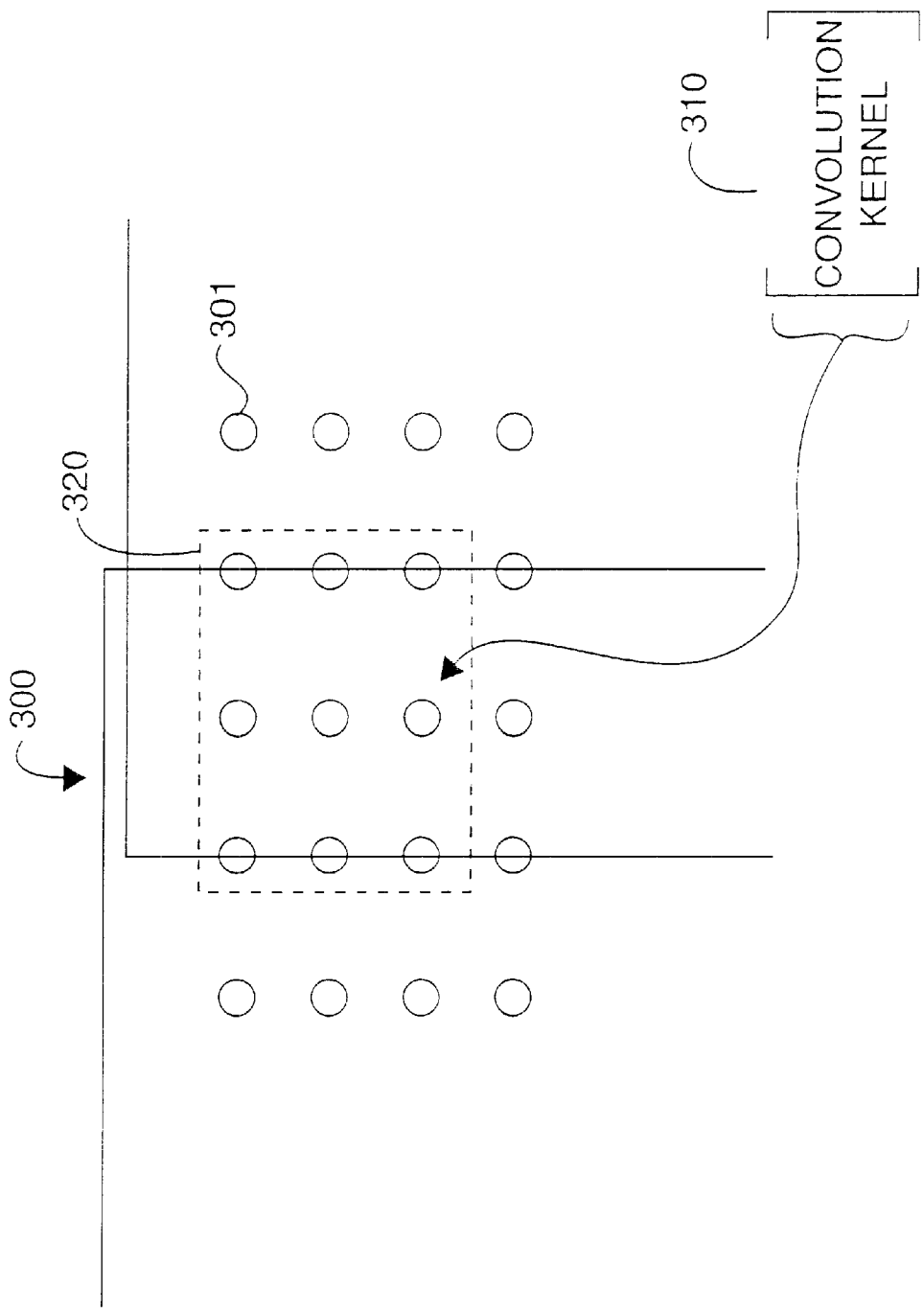
FIG. 3 is a block diagram of overlapping axis aligned sets of voxels.

As shown in FIG. 3, the partitioning of the volume 101 produces axis aligned sets of voxels 301 that have some amount of overlap 300 along their edges. The overlap ensures that values that are derived from a group of adjacent voxels, such as gradients, are properly determined. For example, gradient estimation can apply a convolution kernel 310 to a 3×3×3 group of adjacent voxels 320. A convolution kernel is a matrix (e.g., 3×3×3) of weighting values that are multiplied by the voxels of the group to obtain a singular derived (gradient) value. Other sized kernels, e.g., 2×2×2 or 4×4×4, can also be used. Therefore, the amount of overlap 300 must be large enough to accommodate a largest convolution kernel.

Initial Ray Position

Figure 4:
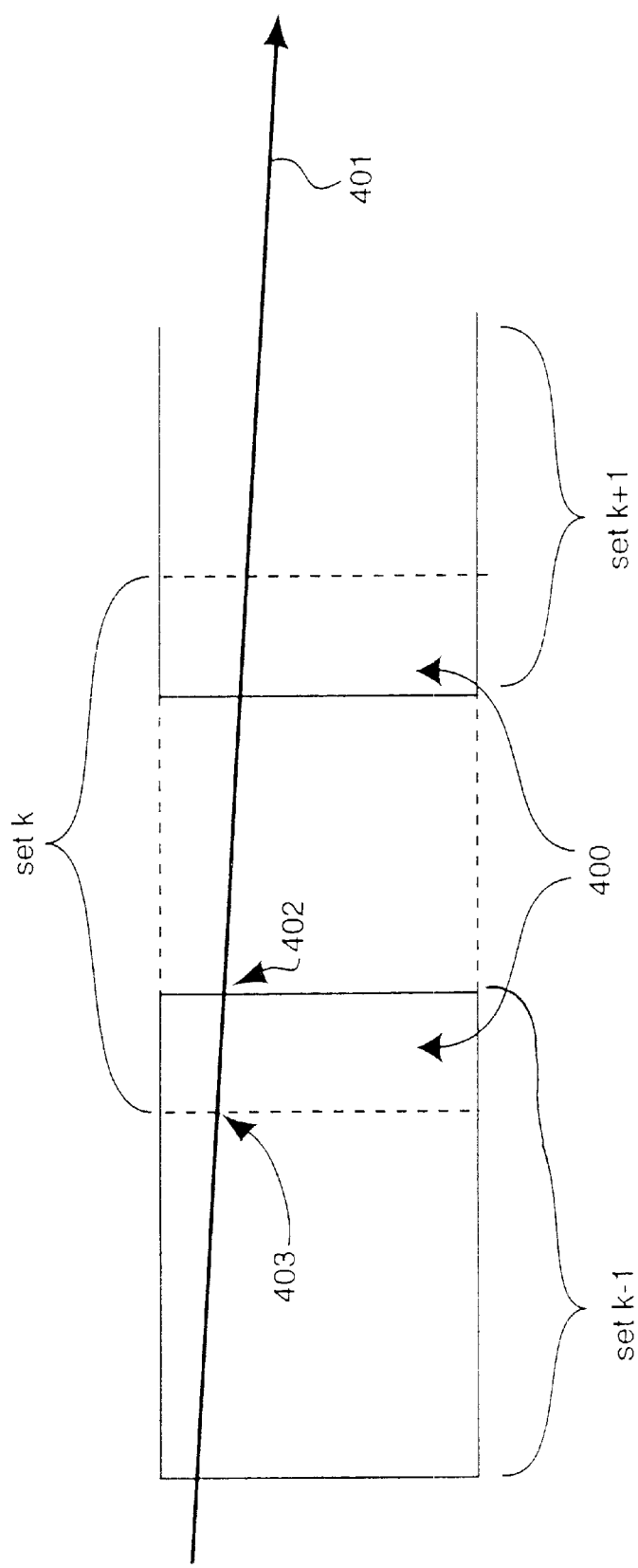
FIG. 4 is a block diagram of a ray passing through overlapping sets of voxels.

However, due to the partitioning as shown in FIG. 4, additional adjustment must be made for overlaps 400 where a ray 401 exits set k−1 at point 402 but enters set k at point 403. Thus, in determining the initial ray offsets for set k, the offset at point 403 should be used instead of the offset 402. In general, for each set of voxels having a z-dimension of Nz, the number of voxels affecting the ray position is Nz minus the number of voxels in the overlap region. Another way to think about this is to only count the common voxels in the second set.

Specifically, for an axis aligned set at Z=k, where k=0, . . . , N−1, the initial ray position Offset in the xy-plane is determined as:

$$OffsetX = StepX*k*Nz - \text{int}(StepX*k*Nz)$$

$$OffsetY = StepY*k*Nz - \text{int}(StepY*k*Nz),$$

where Step is the z-distance between sample points along the ray.

Thus, in general, with overlap compensation, the ray position is determined as follow:

$$OffsetX = \text{fraction}(StepX*(Nz-overlap)*k)$$

$$OffsetY = \text{fraction}(StepY*(Nz-overlap)*k)$$

If the sets have different dimensions, Nz*k is replaced by the sum over all z-dimensions up to kth set.

It is also necessary to deal with the special case of samples that lie on integer voxel positions in the overlap region, otherwise samples can be counted twice. For such samples, the second sample is excluded.

Traversal

Figure 5:
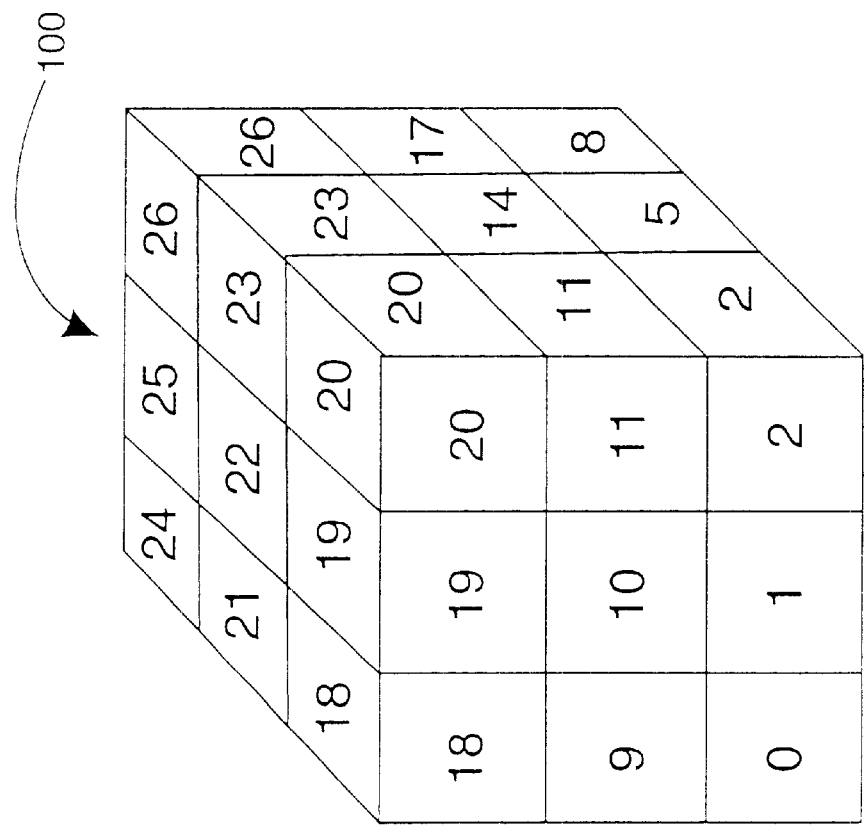
FIG. 5 is a block diagram of a partitioned volume showing traversal order.
Figure 5:
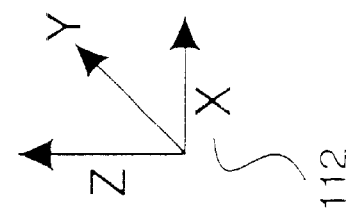

As shown in FIG. 5, the volume 100 is, for example, partitioned into twenty-seven axis aligned sets of voxels. The volume is shown using the permuted coordinates 112 to make all components of the view vectors 103 positive. A constraint of back-to-front combining is there may be no rays exiting a set being rendered that enter another set that is to be rendered at a later time. This defines the traversal order. Front-back combining can also be done with the opposite traversal order. Consequently, the rendering and combining starts at set 26, which has the largest x, y, and z coordinates. Next, examine adjacent sets that have the same z-value, i.e., sets 23 and 25. Rays exiting these two sets either enter set 26 or leave the volume. These sets should be operated on next.

Next, examine the sets that are adjacent to the sets just rendered that have the largest x or y coordinates, in this case, sets 24 and 20. The next intermediate baseplanes come from set 22 because rays exiting the set 22 can only enter sets 23, 25 and 26.

Following the same pattern, select sets 19, 21, and finally set 18 to complete the top face of the volume. Next, move to the next lower z, start at the far-back, i.e., set 17, and continue as for the top face.

In an alternative traversal order, one iterates over one dimension while keeping the other two dimensions at the current maximum, with the z-dimension being the out-most loop:

```
for (z = zmax – 1          ;z >=0; z--)
    for (x = xmax – 1      ;x >=0; x--)
        for (y = ymax – 1  ;y >=0; y--)
            render, and optionally combine, and warp( ).
```

With this traversal order, the order for the top face is sets 26, 23, 20, 25, 23, 19, 24, 21, 18.

Baseplane Size

The baseplane acts as an accumulation buffer during the combining. Therefore, the baseplane is initialized with a background color when a back-to-front traversal is used, and to a foreground color when traversing front-to-back. The size of the baseplane, with (0,0) at the top-left-back, is determined as:

$$EndX=\text{floor}(StepX*NumberOfSteps+SizeX-1)$$

$$EndY=\text{floor}(StepY*NumberOfSteps+SizeY-1).$$

Intermediate Baseplanes

For a volume having NXSubV, NYSubV, and NZSubV sets of voxels in each dimension, the set at (NZSubV–1, NYSubV–1, NZSubV–1), i.e., the first rendered set of voxels, generates an intermediate baseplane that has the same origin as the baseplane. Then for set (i, j, k) where i=0, NXSubV–1, etc., the location of the intermediate baseplane is at:

$$StartX(i,j,k)=i*(Nx-\text{overlap})+StepX*k*(Nz-\text{overlap})$$

$$StartY(i,j,k)=j*(Ny-\text{overlap})+StepY*k*(Nz-\text{overlap}),$$

where Nx, Ny and Nz denote the set dimensions. If the voxel sets are of different sizes, then the terms i*Nx, etc. should be replaced by a sum. The end point of the intermediate baseplane is:

$$IntEndX=StartX+(Nx-1)+StepX*(Nz-1)$$

$$IntEndY=StartY+(Nz-1)+StepY*(Nz-1)$$

Other Rendering Operations

In addition, any rendering operation that operates on the volume as a whole needs to be transformed or divided so each component applies to the set correctly. Such operations include cropping, cursors manipulation, cut-planes, viewing directions, and lighting.

Cropping and Clipping

Cropping and/or clipping allows the application to select regions of interest in the volume to be rendered, or not. U.S. patent application Ser. No. 09/190,645 "Pipelined Cropping for Manipulating Volume Data Sets in Real-Time," incorporated herein by reference, describes a cropping technique for a single volume.

Figure 6:
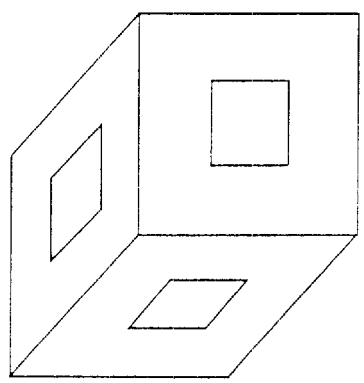
FIG. 6 is a block diagram of volume cropping.
Figure 6:
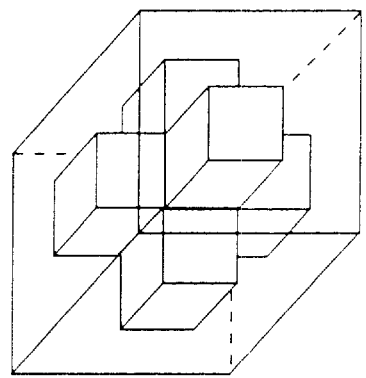
Figure 6:
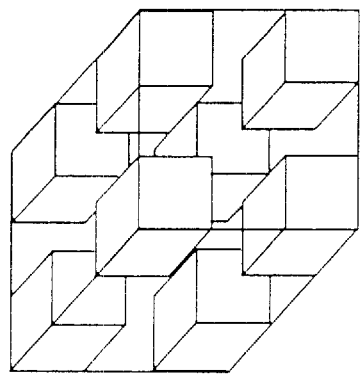
Figure 6:
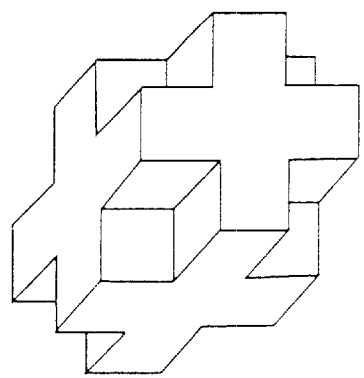
Figure 6:
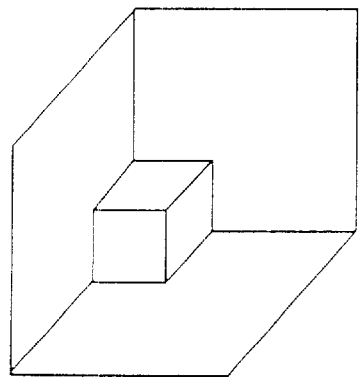
Figure 6:
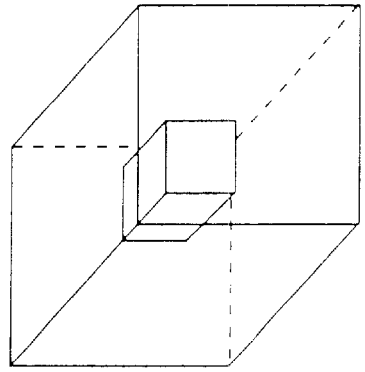
Figure 7B:
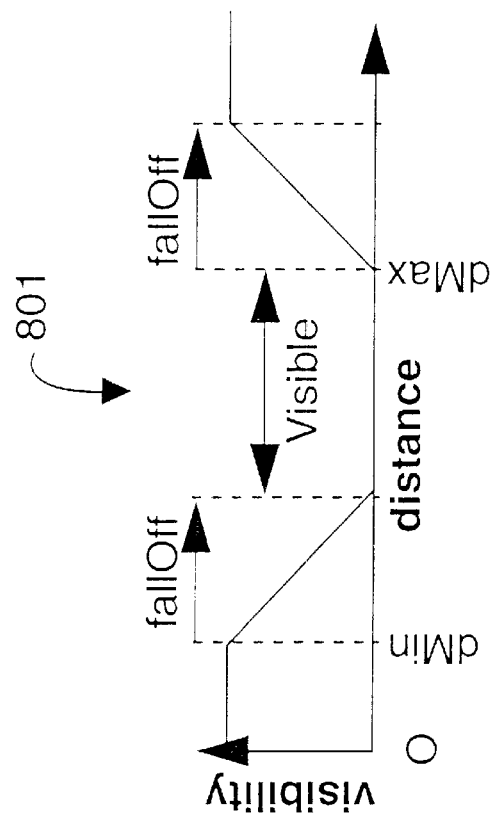
FIGS. 7a and 7b are graphs of visibilities adjacent to volume cut-planes.
Figure 7A:
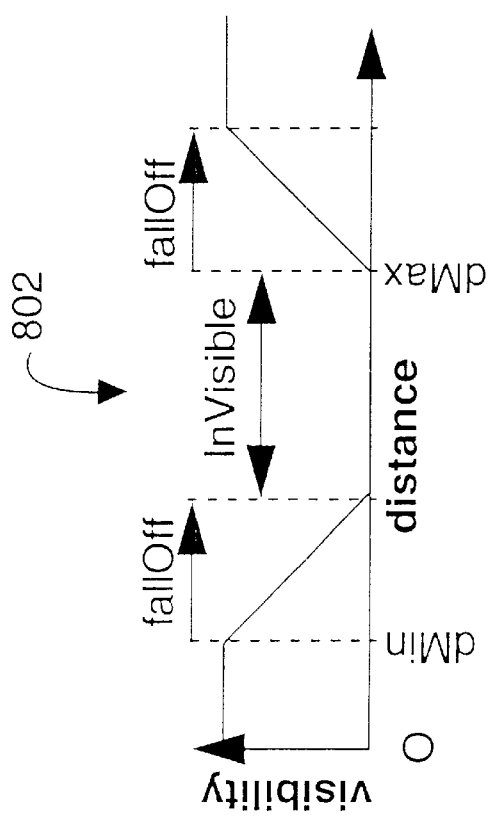

FIG. 6 shows six example of regions of interest 600 that can be selected. Cropping is specified by object coordinates relative to the volume, and is characterized by cropping "slab" thickness in three dimensions, and some logic operations, such as, union, intersection, and the like. In addition, the cropping for the partitioned volume is always axis-aligned. To perform cropping, the location of the slab being cropped is transformed relative to axis aligned voxel sets. The transformation in the three dimensions is decoupled so that each dimension is determined separately. For a subvolume having index (I, j, k), the slab location is transformed as follows, where x and x' are the location of slab relative to the origin of the supervolume and subvolume (I,j,k) respectively:

$$X'=X-(Nx-\text{Overlap})*I$$

$$Y'=Y-(Ny-\text{Overlap})*j$$

$$Z'=Z-(Nz-\text{Overlap})*k.$$

Cursor

A cursor is a form of indicator that can be placed in the rendered image. U.S. patent application Ser. No. 09/190,332 "Three-Dimensional Cursor for a Real-Time Rendering System," that describes a 3D cursor is incorporated herein by reference. In terms of handling a 3D cursor in a partitioned volume data set, the problem is somewhat similar to cropping in that the cursor is specified in object coordinates, and cursor movement is characterized by a set of numbers and some logic, and the cursor is always axes-aligned. The cursor width and length are invariants with respect to a partitioned volume.

Cursor Center

The cursor center $c_{(x,y,z)}$ is specified using object coordinates system relative to the origin of the volume. The transformation needed to translate the location of the center so that it is relative to set (i,j,k) is simply a translation:

$$c_x=x-i*(Nx-\text{Overlap});$$

$$c_y=y-j*(Ny-\text{Overlap});$$

and $$c_z=z-k*(Nz-\text{Overlap}).$$

where (x,y,z) are the cursor center location relative to the origin of the supervolume.

Cut-plane

A cut-plane allows an application to specify two arbitrarily aligned parallel planes that slice through the volume to define which portions are visible. As shown in FIGS. 8a and 8b, there can be two rendering modes supported for these parallel cut-planes: inclusive 801 and exclusive 802. With the inclusive mode, everything between the two cut-planes is visible. In the exclusive mode, everything outside the two cut-planes is visible. As shown. a "fallOff region be specified that defines the distance over which visibility transitions from fully visible to invisible, and vice-versa.

A cut-plane is characterized by a normal (N), a distance (D) from the origin, a thickness (T) and a fall-off distance (F). The cut-plane is specified using object coordinates. Knittel in U.S. patent application Ser. No. 09/190,303 "Incrementally Calculated Cut-Plane Region for Viewing a Portion of a Volume Data Set in Real-Time, incorporated herein by reference, describes a cut-plane apparatus for a rendering pipeline.

Partitioning a volume, into axis aligned sets does not alter the normal direction of the cut-plane nor its thickness and fall-off because relative to each set, the transformation is only a translation. The only parameter that needs to be transformed is the distance vector. For a set (i,j,k), the distance is:

$$Dsub_j=(D-\text{Origin}_{sub})\text{dot } N,$$

where:

$$\text{Origin sub}=(i(Nx-\text{overlap}),j(Ny-\text{overlap}),k(Nz-\text{overlap})),$$

and

In addition, the distance is set to positive or zero, i.e., distance+thickness+fall-off (D+T+F) is set to be within (nx, ny, nz). Furthermore, if (D+T+F) is negative, or the distance is larger than (nx,ny,nz), then the cut-plane should be turned off for this set.

View and Lighting

As an advantage of the present invention, partitioning the volume does not affect the view matrix in anyway, nor does it affect directional lights. Thus, the lighting and viewing direction can change without having to repartition the volume.

It is to be understood that various other adaptations and modifications may be made within the spirit and scope of the invention. Therefore, it is the object of the appended claims to cover all such variations and modifications as come within the true spirit and scope of the invention.

We claim:

1. A method for shear-warp rendering a volume data set having voxels arranged according to object coordinates, comprising the steps of:

partitioning, relative to the object coordinates, the volume data set into a plurality of axis aligned sets of voxels;

rendering selected axis aligned sets of voxels as pixels in intermediate baseplanes, there being one intermediate baseplane for each selected set of axis aligned voxels;

combining and warping the intermediate baseplanes to an image.

2. The method of claim 1 further comprising the step of:

selecting an arbitrary viewing direction after partitioning, and rendering the partitioned volume data set according to the selected viewing direction.

3. The method of claim 1 wherein the combining and warping is performed after all of the intermediate baseplanes have been rendered.

4. The method of claim 1 wherein the combining and warping is performed after each intermediate baseplane has been rendered.

5. The method of claim 3 or claim 4 wherein the intermediate baseplanes are combined in a correct visibility order according to an arbitrary viewing direction.

6. The method of claim 1 further comprising the steps of:

selecting an arbitrary number of voxels in the volume data set to partition into axis aligned sets of voxels having arbitrary dimensions.

7. The method of claim 6 wherein selecting is independent of viewing parameters.

8. The method of claim 1 wherein the selected axis aligned sets of voxels are rendered in parallel.

9. The method of claim 1 wherein the selected axis aligned sets of voxels are rendered serially.

10. The method of claim 1 wherein the rendering is performed by a plurality of parallel hardware pipelines fabricated on a single semiconductor chip.

11. The method of claim 1 wherein the voxels of neighboring axis aligned sets of voxels overlap.

12. The method of claim 11 wherein an the amount of overlap depends on a largest convolution kernel applied to the axis aligned sets of voxels while rendering.

13. The method of claim 1 wherein each selected axis aligned set of voxels is rendered independent of other axis aligned sets of voxels.

14. The method of claim 1 wherein a particular axis aligned set of voxels is one-dimensional.

15. The method of claim 1 wherein a particular axis aligned set of voxels is two-dimensional.

16. The method of claim 1 wherein a particular axis aligned set of voxels is three-dimensional.

17. The method of claim 1 wherein the intermediate baseplanes are combined into a baseplane, and the baseplane is warped into the image.

18. The method of claim 1 wherein the intermediate baseplanes are warped to intermediate images, and the intermediate images are combined into the image.

19. The method of claim 1 further comprising the step of:

rendering a three-dimensional axis aligned cursor while rendering the axis aligned sets of voxels.

20. The method of claim 1 further comprising the steps of:

specifying two axis aligned cut-planes prior to rendering the axis aligned sets of voxels.

21. The method of claim 20 wherein axis aligned sets of voxels between the cut-planes are rendered.

22. The method of claim 20 wherein axis aligned sets of voxels outside the cut-planes are rendered.

23. An apparatus for rendering a volume data set having voxels arranged according to object coordinates, comprising:

a voxel memory storing the volume data set partitioned, relative to the object coordinates, into a plurality of axis aligned sets of voxels;

a rendering engine for rendering selected axis aligned sets of voxels as pixels in intermediate baseplanes, there being one intermediate baseplane for each selected block;

a baseplane memory storing the intermediate baseplanes; and means for combining and warping the intermediate baseplanes into an image.

24. The apparatus of claim 23 wherein the rendering engine comprises:

a plurality of processing pipelines concurrently rendering the selected axis aligned sets of voxels.

25. The apparatus of claim 23 wherein a plurality of rendering engines operate on multiple axis aligned sets of voxels in parallel.

26. The apparatus of claim 23 wherein the intermediate data stored in the section memory includes partial results of rendering computations that overlap with partial results of neighboring axis aligned sets of voxels.

* * * * *